Patented Sept. 20, 1932

1,878,666

UNITED STATES PATENT OFFICE

BERNHARD BOLLWEG, OF LEVERKUSEN-ON-THE-RHINE, LUDWIG ZEH, OF WIESDORF-ON-THE-RHINE, AND ERWIN KRAMER, OF COLOGNE-DEUTZ, GERMANY, ASSIGNORS TO GENERAL ANILINE WORKS, INC., OF NEW YORK, N. Y., A CORPORATION OF DELAWARE

HALOGEN SUBSTITUTION PRODUCT OF DINAPHTHYLENE-DIOXIDE

No Drawing. Application filed August 12, 1929, Serial No. 385,475, and in Germany September 8, 1928.

The present invention relates to a process of preparing halogen substitution products of dinaphthylene-dioxide and to the new products obtainable thereby, more particularly it relates to dinaphthylene-dioxide derivaties which may be represented by the following formula:

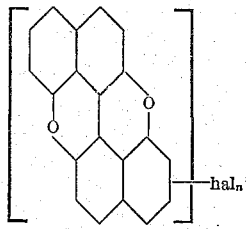

wherein "hal" stands for a halogen atom having an atomic weight between 35 and 80 and "n" stands for one of the numbers 1 to 10.

According to the invention, the halogen substitution products of the above identified general formula are prepared by chlorinating or brominating dinaphthylene-dioxide in a suitable organic solvent, either in suspension or solution. For the purpose of the invention there can be used any organic solvent which is not attacked by the halogen or halogen compound employed in the halogenation process, for example, nitrobenzene, chlorobenzene and trichlorobenzene. The halogenation is carried out in the usual manner by slowly introducing into the suspension or solution of dinaphthylene-dioxide halogen of an atomic weight between 35 and 80 or a suitable compound thereof customarily used for halogenating purposes, such as sulfur monochloride, sulfur dichloride, thionyl chloride, sulfuryl chloride and the like. The temperature used may be varied within the widest limits, say from room temperature to about 200° C.

According to the invention, various intermediate products can be obtained, the final stage of the halogenation being the formation of the decahalogen-dinaphthylene-dioxide. The new products are generally yellowish substances. They are suitable for use as pigments and compared with the parent substance they yield fuller shades and are distinguished by a considerably improved fastness to light; they also possess a satisfactory fastness to alcohol and oil.

The invention is illustrated by the following examples, without being limited thereto:

*Example 1:*— 36 parts by weight of chlorine are passed into a solution of 70.5 parts by weight of dinaphthylene-dioxide and 1500 parts by weight of 1.2.4-trichlorobenzene, heated to 200° C. After cooling the dichloro-naphthylene-dioxide formed is filtered off and freed from adhering trichlorobenzene by means of alcohol. It forms brilliant yellow crystals and can be employed as a yellow pigment.

*Example 2:*— Tetrachlorodinaphthylene-dioxide is obtained as described in Example 1, but with the use of 72 parts by weight of chlorine. The new substance forms yellow crystals.

For use as a printing color 100 parts by weight of a 10% aqueous suspension of aluminium hydroxide are mixed with 30 parts by weight of a 10% pigment paste of tetrachlorodinaphthylene dioxide filtered, dried and compounded with printer's varnish by grinding.

The aluminium hydroxide is obtained as follows: 1 kg. of aluminium sulfate (18% $Al_2O_3$) is dissolved in 10 liters of water, then precipitated with a solution of 500 grams of sodium carbonate in 5 liters of water and decanted three times.

*Example 3:*— 180 parts by weight of chlorine are passed into a hot solution of 70.5 parts by weight of dinaphthylene-dioxide and 4500 parts by weight of trichlorobenzene. The working up is effected as described in Example 1. The decachlorodinaphthylene-dioxide produced crystallizes from chloronaphthalene in well formed yellow needles.

*Example 4:*— For the manufacture of tetrabromodinaphthylene-dioxide, 70.5 parts by weight of dinaphthylene-dioxide are dissolved in 4500 parts by weight of hot trichlorobenzene and 160 parts by weight of bromine in 500 parts by weight of trichlorobenzene are dropped in. After cooling the tetrabromodinaphthylene-dioxide precipitated is filtered and washed with alcohol.

For the manufacture of oil colors 5 parts by weight of dibromodinaphthylene-dioxide are ground with 100 parts by weight of heavy spar on the edge mill until the color is fully developed and then compounded with linseed oil by grinding.

We claim:

1. The process which comprises halogenating by means of an agent introducing halogen of an atomic weight between 35 and 80 dinaphthylene-dioxide in finely divided condition in an inert organic solvent.

2. The process which comprises halogenating by means of an agent introducing halogen of an atomic weight between 35 and 80 dinaphthylene-dioxide dissolved in trichlorobenzene.

3. The process which comprises chlorinating at a temperature between room temperature and about 200° C. dinaphthylene-dioxide in finely divided condition in an inert organic solvent.

4. The process which comprises chlorinating at about 200° C. dinaphthylene-dioxide dissolved in trichlorobenzene.

5. As new products the halogen substitution products of dinaphthylene-dioxide of the probable general formula:

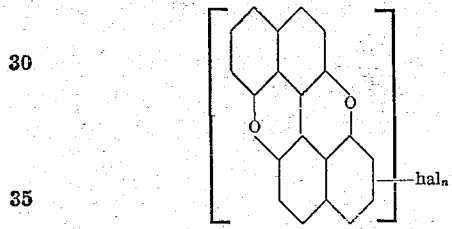

wherein "hal" stands for a halogen atom having an atomic weight between 35 and 80 and "$n$" stands for one of the numbers 1 to 10 and which are obtainable by halogenation of dinaphthylene-dioxide in an inert solvent, being generally yellowish to blackish-brown pigments fast to light.

6. As new products the halogen substitution products of dinaphthylene-dioxide of the probable general formula:

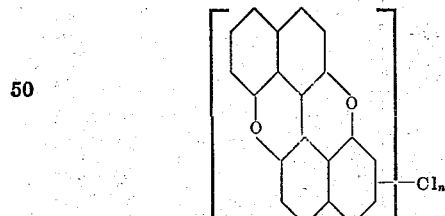

wherein "$n$" stands for one of the numbers 1 to 10 and which are obtainable by halogenation of dinaphthylene dioxide in an inert solvent, being generally yellowish pigments fast to light.

7. As a new product a tetrachlorodinaphthylene-dioxide obtainable by chlorination of dinaphthylene-dioxide in an inert solvent, being a yellowish crystallizing pigment fast to light.

8. As a new product deca-chloro-dinaphthylene-dioxide, being a yellowish crystalline pigment fast to light.

9. As a new product a tetra-bromo-dinaphthalene-dioxide obtainable by brominating dinaphthylene-dioxide in an enert solvent, being a yellowish crystalline pigment fast to light.

In testimony whereof we have hereunto set our hands.

BERNHARD BOLLWEG.
LUDWIG ZEH.
ERWIN KRAMER.